United States Patent [19]
Cheong et al.

[11] Patent Number: 5,694,573
[45] Date of Patent: Dec. 2, 1997

[54] SHARED L2 SUPPORT FOR INCLUSION PROPERTY IN SPLIT L1 DATA AND INSTRUCTION CACHES

[75] Inventors: Hoichi Cheong; Dwain A. Hicks; Kimming So, all of Travis County, Tex.

[73] Assignee: International Business Machines Corporation, Armonk, N.Y.

[21] Appl. No.: 781,922

[22] Filed: Dec. 30, 1996

Related U.S. Application Data

[63] Continuation of Ser. No. 349,226, Dec. 5, 1994, abandoned.

[51] Int. Cl.⁶ ........................................ G06F 12/08
[52] U.S. Cl. .................. 395/449; 395/450; 395/457; 395/472; 395/451
[58] Field of Search ........................... 395/451, 449, 395/450, 452, 453, 447, 448, 457, 471, 472, 468, 200.08

[56] References Cited

U.S. PATENT DOCUMENTS

| | | | |
|---|---|---|---|
| 4,445,174 | 4/1984 | Fletcher | 395/448 |
| 4,719,568 | 1/1988 | Carrubba et al. | 395/450 |
| 4,755,930 | 7/1988 | Wilson, Jr. et al. | 395/449 |
| 4,783,736 | 11/1988 | Ziegler et al. | 395/457 |
| 4,794,521 | 12/1988 | Ziegler et al. | 395/457 |
| 4,853,846 | 8/1989 | Johnson et al. | 395/281 |
| 4,926,317 | 5/1990 | Wallach et al. | 395/403 |
| 5,023,776 | 6/1991 | Gregor | 395/449 |
| 5,163,142 | 11/1992 | Mageau | 395/469 |
| 5,168,560 | 12/1992 | Robinson et al. | 395/450 |
| 5,185,871 | 2/1993 | Frey et al. | 395/381 |
| 5,202,972 | 4/1993 | Gusefski et al. | 395/450 |
| 5,394,555 | 2/1995 | Hunter et al. | 395/800 |
| 5,490,261 | 2/1996 | Bean et al. | 395/448 |
| 5,530,832 | 6/1996 | So et al. | 395/449 |
| 5,539,895 | 7/1996 | Bishop et al. | 395/465 |

*Primary Examiner*—Matthew M. Kim
*Attorney, Agent, or Firm*—Whitham, Curtis, Whitham, & McGinn; Anthony V. England, Jr.

[57] ABSTRACT

A multi-processor data processing system has a multi-level cache wherein each processor has a split high level (e.g., level one or L1) cache composed of a data cache (DCache) and an instruction cache (ICache). A shared lower level (e.g., level two or L2) cache includes a cache array which is a superset of the cache lines in all L1 caches. There is a directory of L2 cache lines such that each line has a set of inclusion bits indicating if the line is residing in any of the L1 caches. A directory management system requires only N+2 inclusion bits per L2 line, where N is the number of processors having L1 caches sharing the L2 cache.

2 Claims, 3 Drawing Sheets

5,694,573

SHARED L2 SUPPORT FOR INCLUSION PROPERTY IN SPLIT L1 DATA AND INSTRUCTION CACHES

DESCRIPTION

This application is a continuation of the U.S. patent application Ser. No. 08/349,226 filed Dec. 5, 1994, now abandoned.

BACKGROUND OF THE INVENTION

1. Field of the Invention

The present invention generally relates to the management of cache memories in data processing systems and, more particularly, to multi-level shared cache memories in a multi-processor (MP) data processing system.

2. Description of the Prior Art

To support a multi-processor (MP) system with multi-level shared cache memory, an important property, the Inclusion Property, needs to be maintained to prevent extensive cross-interrogation. The Inclusion Property is that the residence of a cache copy at a higher level cache (e.g., level 1 or L1) implies residence at the lower level caches (L2, L3 ...). A cache directory at a lower level cache shared by multiple caches at the next higher level records the residence of a cache copy at these sharing caches. Usually, one bit, the Inclusion Bit, is used for each cache at the next higher level. When there is a need to perform logic operations on a cache copy at the present level, the directory logic can decide which higher level caches have a copy from the inclusion bits, and cross-interrogation can be propagated to the precise destinations. Without the inclusion bits, cross-interrogation needs to be blindly broadcast to the higher level caches. However, in order to prevent broadcast, we need to use at least one bit to reflect the residence of each higher level cache. For example, if N processors, each with an L1 cache, share an L2 cache, each L2 cache directory entry will need to have at least N bits to record the residence of a cache copy loaded into an L1 cache. (When sectoring is used, i.e., one L2 cache line spans M consecutive L1 lines, each L2 cache entry needs M×N inclusion bits.) Otherwise, the L2 cache needs to cross-interrogate all the L1 caches when operations need to be performed on a cache copy, presumably in some L1 cache.

The inclusion bit also serves an important purpose; specifically, the L2 cache directory can grant the exclusive right of a cache copy to a requesting L1 cache based on the inclusion bits information. Exclusion right is important because an L1 cache can modify an exclusive copy without incurring communication with the L2 cache. This requires that the L2 cache inclusion bits must preserve accuracy in order to grant an L1 cache exclusive right.

Advanced processors usually split the L1 cache into a data cache (DCache) and an instruction cache (ICache). Twice the number of bits are required to keep the Inclusion Property in a system with a spit L1 cache because an L2 cache copy can be in a processor's Dcache, Icache or both caches. These processors usually have additional cache operation instruction to maintain coherence among data and instruction caches in the system. In a shared L2 cache supporting several such processors, it is important to avoid broadcasting cache operation instructions to the split L1 caches. A solution to balance out the need to avoid excessive communication overhead (broadcast), without paying twice the inclusion bit cost or losing accuracy is needed.

SUMMARY OF THE INVENTION

It is therefore an object of the present invention to provide a method at the storage controller of an L2 cache to keep track of split L1 cache content in a multi-processor system with half of the record bits.

According to the invention, there is provided a scheme to keep track of cache lines being used by one or more of the processors in multi-processor (MP) data processing system. More particularly, the scheme is applied to a multilevel cache system wherein each processor has its own L1 cache and the several processors in the system share an L2 cache. Each L1 cache is split into a data cache (DCache) and an instruction cache (ICache). The L2 cache is provided with a directory which, in addition to Inclusion bits, also includes D and I bits.

This invention enables a lower level cache, which is shared by data and instruction, to accurately keep track of L1 cache inclusion in the next higher level caches which are split into DCache and ICache. With this invention, the lower level cache can also accurately keep track of instruction cache inclusion in the case when the lower level cache entry is only used as instructions at the next higher level. This invention reduces the cost of maintaining inclusion within a hierarchical memory system by using far less inclusion bits than alternative methods which maintain both data cache inclusion and instruction cache inclusion all the time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
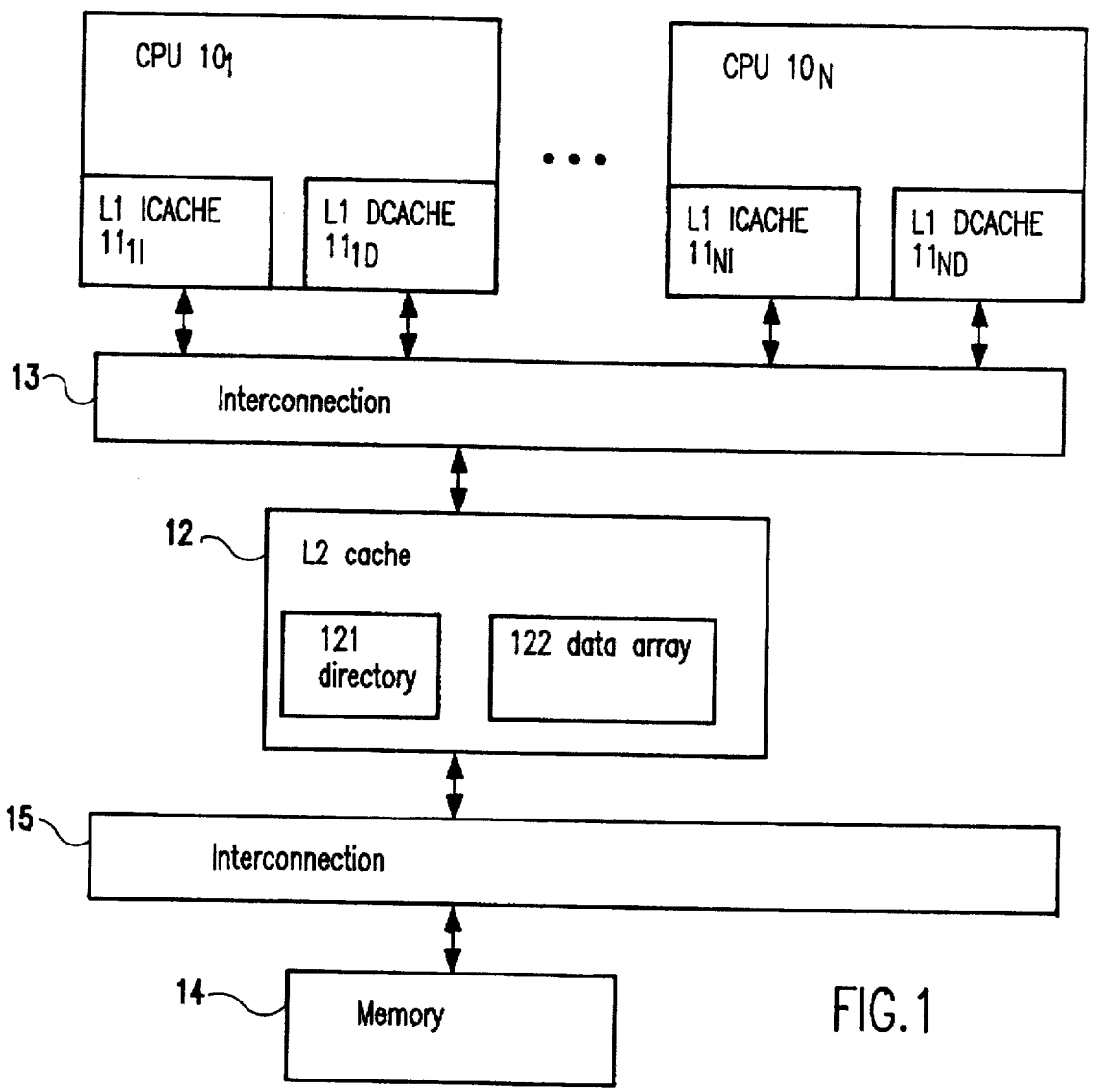
FIG. 1 is a block diagram showing a multi-processor system having a multilevel cache memory on which the present invention may be implemented.

Referring now to the drawings, and more particularly to FIG. 1, there is shown a typical multi-processor (MP) data processing system including a plurality of processors $10_1$ to $10_N$, each having a level 1 (L1) cache. As exemplified by the L1 cache of processor $10_1$, each L1 cache is split into a data cache (DCache) $11_{1D}$ and an instruction cache (ICache) $11_{1I}$. The L1 caches of each processor communicate with a shared level 2 or L2 cache 12. Request and data transfers between L1 caches and the L2 cache 12 is by an interconnection medium, such as point-to-point interconnects, a bus or a switch network 13. Request and data transfers between the L2 cache and main memory modules 14 is through the interconnect 15, such as point-to-point interconnects, bus or switch.

Figure 2:
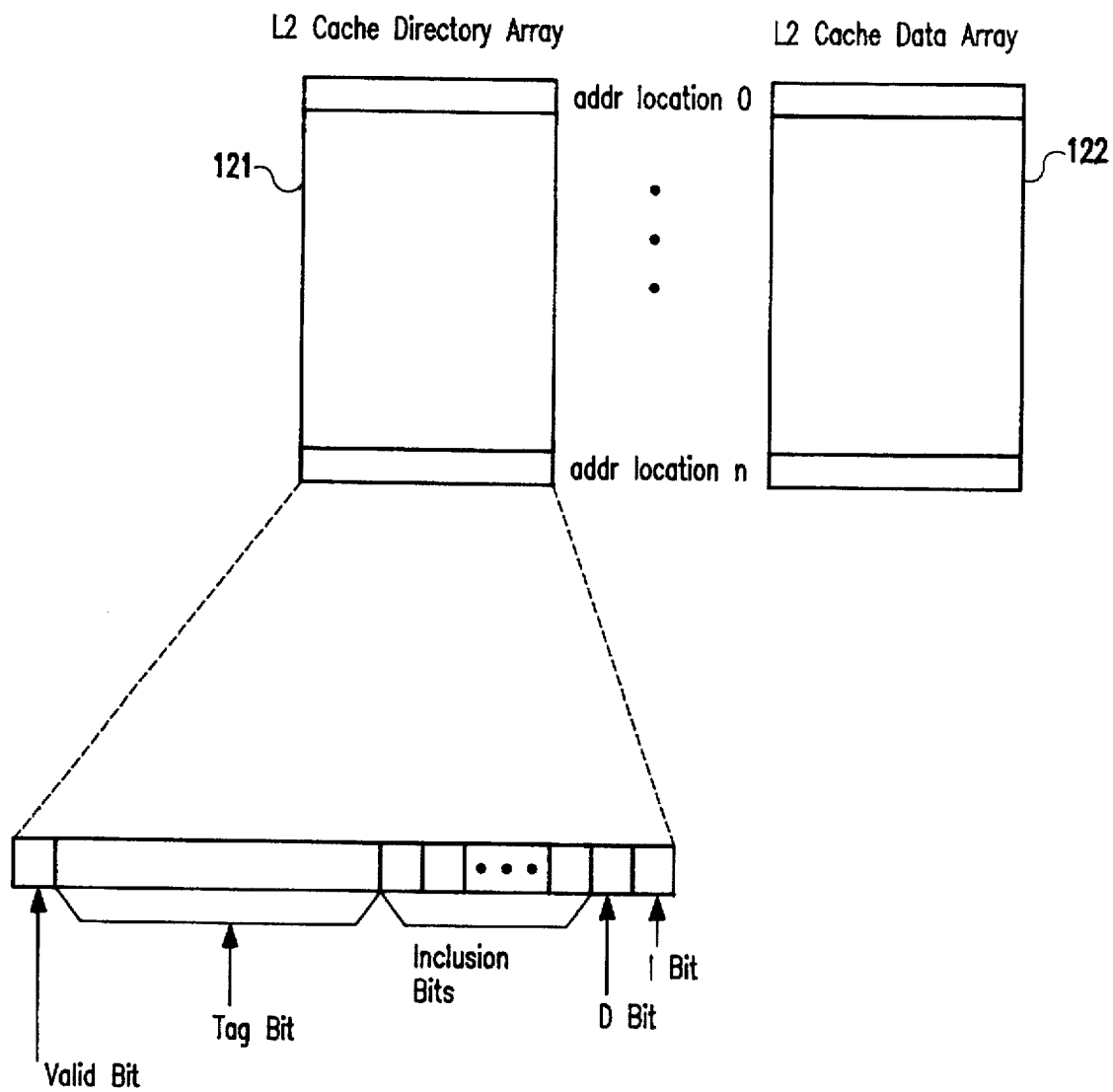
FIG. 2 is a cache memory map showing a lower level cache and a corresponding lower level cache directory illustrating items in a directory entry used by this invention.

The L2 cache 12 has a directory 121 and data array 122, as depicted in FIG. 2. Status bits to represent inclusion of L1 data and L1 instruction reside in directory 121. There is also control logic (not shown) associated with the L2 cache. The directory 121 contains bookkeeping information for each cache line. For each L2 cache line, there is a directory entry corresponding to that line. Each directory entry contains a valid bit, an address tag, N inclusion bits, a D bit and an I bit. When a cache location is accessed, the directory entry and the data are retrieved. The valid bit is used to determine whether the line is a valid line (or cache location that contains a valid line). A logic one indicates that the cache line is valid, and a logic zero means that the cache location does not contain a valid cache line. The address tag is compared with the tag portion of the request address. If the comparison is a match, the valid line in the accessed cache location is the cache line requested. If it is not a match, the cache location does not contain the line wanted by the requester. The N inclusion bits, the D bit, and the I bit are used to identify whether the particular cache line requested by the requester reside in any of the L1 caches. The information these bits provide is described in detail infra.

FIG. 2 depicts a possible organization of a directory entry. The number of inclusion bits for an N processor system can be some number n, less than N, per cache entry if a certain amount of broadcast can be tolerated in a non-split L1 cache system. However, the present invention is specifically aimed at avoiding doubling the number of bits due to split L1 caches, and it applies to whatever reduction scheme for non-split caches.

Without loss of generality, a non-sectored L2 cache 12 requiring at least one bit per processor in a non-split L1 cache system is assumed, and the scheme presented requires only 1+2/N bits per processor for a cache system with N processors (N+2 bits per split cache entry as opposed to 2N bits are used). In a large L2 cache, saving N−2 bits amounts to saving kilobytes of directory space. If the L2 cache is sectored with one L2 line equal to m L1 lines, the present invention requires only mN+2 bits instead of 2mN bits. The savings is thus even more significant.

The present invention uses one inclusion bit per processor. For a system with N processors, each L2 directory entry has an N-bit vector, each bit corresponding to a processor. When an L2 cache datum is in a processor's L1 cache, that processor is called a residence processor.

The present invention uses two extra bits, D and I, per cache line besides the N inclusion bits. When an L2 datum is in only L1 DCaches, the D bit is set and the inclusion bits pertaining to the resident processors are set. When an L2 datum is in only L1 ICaches, the I bit is set and the corresponding inclusion bits are set. In the case of either the D or I bit being on, operation on the cache copy can be forwarded to the specific L1 cache of the processor specified by the ON states of the corresponding inclusion bits. When operations can be forwarded to a specific L1 cache according to the on state of respective inclusion bits, we say that the inclusion is precise. When both the D and I bits are on, Inclusion bits only pinpoint L1 Dcache residence, and it is assumed that the L2 cache copy is in every processor's ICache. When operations have to be broadcast to all L1 caches of a specific type (D cache or I cache) regardless of the inclusion bit setting, we say that the inclusion is not precise. In the case of both the D bit and the I bit being on, the inclusion of the L1 ICaches is imprecise but the inclusion of the L1 DCaches is precise.

By the above scheme, the L2 directory always keeps track of precisely which L1 DCache has an L2 copy. It can grant exclusive right of a cache copy to an L1 cache when the Inclusion bits show no other L1 DCache inclusion. No broadcasting of DCache operations is needed. The L2 directory 121 also keeps track precisely which L1 ICache has an L2 copy when the L2 cache copy is used only as an instruction by the processors (only I bit set). The only imprecise inclusion information occurs when both D and I bits are set, but the impreciseness is only on the ICache inclusion in this limited case. The cost of this impreciseness is the broadcast incurred when instruction cache operations needs to be propagated to L1 caches. By paying this cost, only 1+2/N bits are needed instead of two bits per L1 cache line for each processor. (For a sectored cache, the cost is $$1 + \frac{2}{mN} .)$$

In a typical sectored L2 cache system, the D and I bits can be used per L2 cache line without much loss of information since consecutive L1 cache lines tend to be used for the same purpose, i.e., all in ICache, all in DCache, or all in both caches. The following discussion will focus on a non-sectored L2 cache, but the scheme easily applies to a sectored L2 cache and is actually implemented on a sectored L2 cache.

The following describes the conditions to set the D, the I and the Inclusion bits:
1. When a copy with both D and I bits not set is loaded into a L1 DCache, set the D bit and set the inclusion bit for the requesting L1 cache (precise inclusion on the DCache).
2. When a copy with both D and I bits not set is loaded into a L1 ICache, set the I bit and set the inclusion bit for the requesting L1 cache (precise inclusion on the ICache).
3. When a copy with only the I bit set is loaded into a L1 DCache, reset all existing inclusion bits and set the inclusion for the requesting L1 cache and the D bit (change from precise inclusion on the L1 ICache to the L1 DCache).
4. When a copy with only the I bit set is loaded into an L1 ICache, set the inclusion bit for the requesting L1 cache (precise inclusion on the L1 ICache).
5. When a copy with only the D bit set is loaded into an L1 ICache, set the I bit (precise inclusion on the L1 DCache).
6. When a copy with the D bit set (I bit either set or not set) is loaded into an L1 DCache, set the inclusion bit for the requesting L1 cache (precise inclusion on the L1 DCache).
7. When a copy with both the D and I bits set is loaded into an L1 ICache, do nothing (precise inclusion on the L1 DCache).

The following describes the conditions to reset the D and I bits and the Inclusion bits:
1. When a copy with only the D or I bit set is replaced out of an L1 cache that has a copy, the corresponding inclusion bit is reset (precise inclusion on either L1 DCache or ICache).
2. When a copy with only the D or I bit set is replaced out of the last L1 cache that has the copy, the corresponding Inclusion bit is reset and the D or the I bit is also reset (precise inclusion on either the L1 DCache or ICache).
3. When a copy with both D and I bits are set, the inclusion bit corresponding to an L1 cache is reset if the copy is replaced out of that L1 DCache (precise inclusion on the L1 DCache).
4. When a copy with both D and I bits are set, the inclusion bits are unchanged if the copy is replaced out of that L1 ICache (imprecise inclusion on the L1 ICache only).
5. When a copy with both D and I bits are set, the D and I bits are reset only when the L2 cache copy is replaced out of the L2 cache (zero inclusion).

The following describes the conditions how the I bit, the D bit and the inclusion bits are used when the L2 directory management means is removing a line from the L2 cache:
1. When a copy with neither the I bit or the D bit is set is replaced out of the L2 cache, the directory management means does not have to purge the lines out of the L1 data caches or the L1 instruction caches.

2. When a copy with only the D bit set is replaced out of the L2 cache, the directory management means purges the lines out of the L1 data caches using the inclusion bit to direct its request to data cache(s) most likely to possess a copy.
3. When a copy with only the I bit set is replaced out of the L2 cache, the directory management means purges the lines out of the L1 instruction caches using the inclusion bit to direct its request to instruction cache(s) most likely to possess a copy.
4. When a copy with the D bit set and I bit set is replaced out of the L2 cache, the directory management means purges the L1 copies out of all L1 instruction caches and selective L1 data cache(s) using the inclusion bit to direct its request to cache(s) most likely to possess a copy.

The following describes how interrogations from the memory are handled by the L2 directory management means:

1. When a copy with neither the I bit set or the D bit set is interrogated by memory, the directory management means does not forward the interrogation of the L1 data cache(s) or the L1 instruction cache(s).
2. When a copy with only the D bit set is interrogated by memory, the directory management means forwards the interrogation to the L1 data cache(s) using the inclusion bits.
3. When a copy with only the I bit set is interrogated by memory, the directory management means forwards the interrogation to the L1 instruction cache(s) using the inclusion bits.
4. When a copy with both the D bit set and the I bit set is interrogated by memory, the directory management means forwards the interrogation to all L1 instruction caches and selective L1 data cache(s) using the inclusion bit to direct its request to cache(s) most likely to possess a copy.

Figure 3:
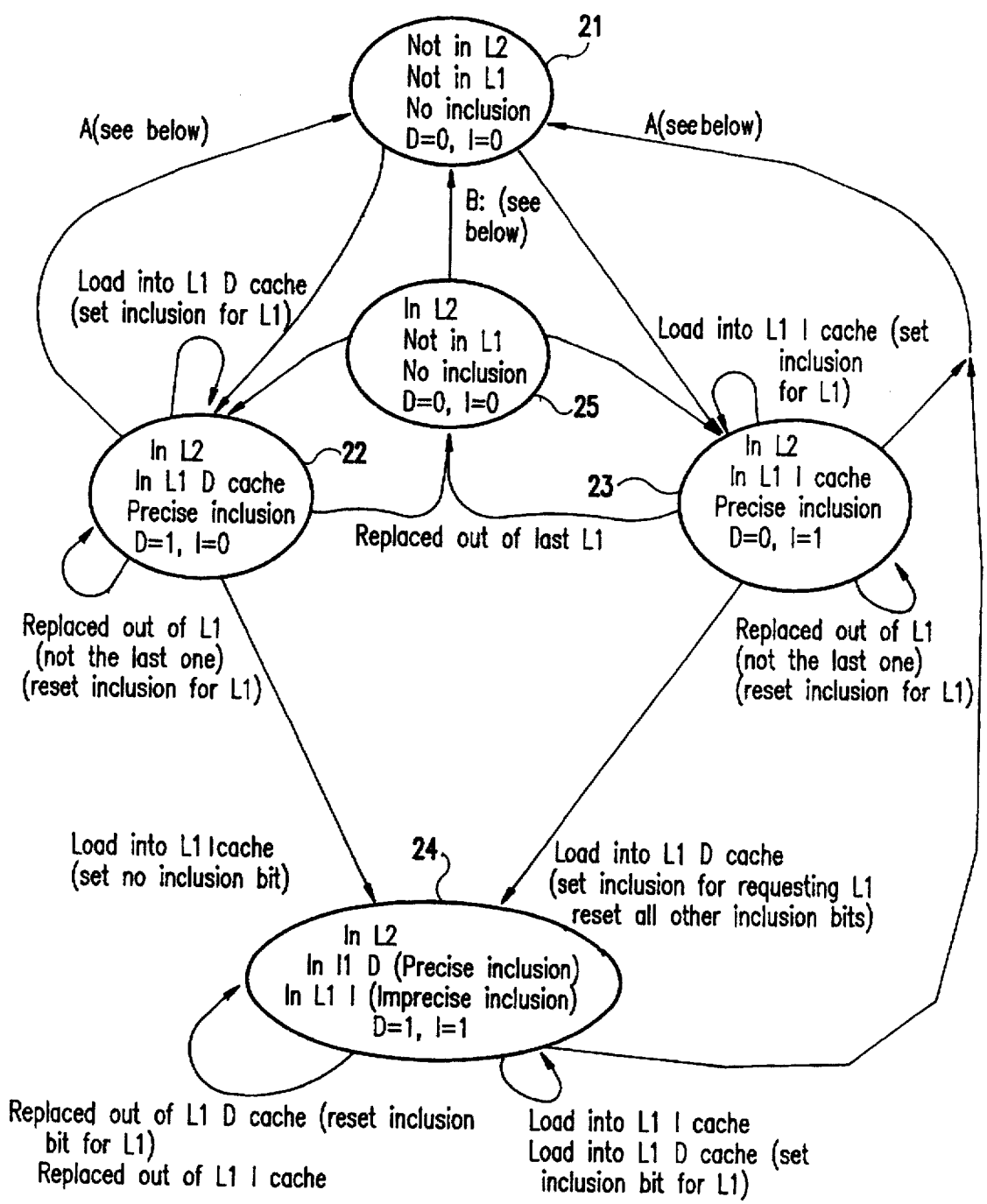
FIG. 3 is a state diagram depicting the logic of the process for keeping track of L1 cache copies according to the invention.

The state diagram of FIG. 3 describes the change of the D and I bit, and the change of inclusion bits among representing DCache, different states of a lower level cache line. The inclusion bits, D bit and the I bits, with their On (logic 1) and Off (logic 0) settings constitute different states of a cache line. Each cache line starts in state 21, and changes to other states as a result of operations performed on the caches. Table 1 shows the effect of each state on the cache line.

TABLE 1

| State number | Valid bit | D bit | I bit | Inclusion bits | Description |
|---|---|---|---|---|---|
| 21 | off | off | off | none on | cache line not in L2 or L1 |
| 22 | on | on | off | at least one on (precise inclusion on D cache) | cache line in L2 and in L1 D cache only corresponding to ON-inclusion bits |
| 23 | on | off | on | at least one on (precise inclusion in I cache) | cache line in L2 and in L1 I cache only corresponding to ON-inclusion bits |
| 24 | on | on | on | zero to N bits on (precise inclusion on D cache, imprecise inclusion on I cache) | cache line in L2, assumed to be in L1 I cache, and in D cache corresponding to the ON inclusion bits |
| 25 | on | off | off | all bits off | cache line in L2 only |

Operations that can affect state changes include, load cache line in L2 and L1 D cache, load cache line in L2 and L1 I cache, load cache line from L2 to L1 I cache, load cache line from L2 to L1 D cache, replace line from L1 I cache, replace cache line from L1 D cache, replace cache line from L2 cache and all L1 caches.

Beginning at the top of FIG. 3, state 21 is the condition where a copy is not in the L2 cache or in any L1 cache. Under this condition, each of the Inclusion bit and the D and I bits are reset to zero. If a copy is loaded into the L2 cache from main memory and then loaded into a requesting L1 DCache, following the path from state 21 to state 22, the inclusion bit for the requesting L1 cache is set and the D bit is set, but the I bit remains reset. If on the other hand, a copy is loaded into the L2 cache from main memory and then loaded into the requesting L1 ICache, following the path from state 21 to state 23, the inclusion bit for the requesting L1 cache is set and the I bit is set, but the D bit remains reset.

From state 22, if a copy is now loaded into L1 ICache, or from state 23, if a copy is now loaded into L1 DCache, both the D and I bits are set in state 24. From state 22 to 24, no additional inclusion bit is set. From state 23 to 24, inclusion bit is set only for the newly loaded DCache, and all other inclusion bits are reset. Again from states 22 and 23, if the copy is replaced from both the L1 and L2 caches, a return is made to state 21 and all inclusion bits are reset. If the copy is replaced out of the last L1 cache, state 25 is assumed where the copy remains in the L2 cache but is not in any L1 cache. Therefore, the Inclusion bits are reset and both the D and I bits are reset. Should the copy later be copied to one of the L1 caches, either state 22 or 23 is assumed, depending on whether the copy is copied to the DCache or ICache. Should the copy in the L2 cache be replaced, state 21 is again assumed.

A cache line stays in state 24 until the cache line is replaced from L2 cache and all L1 caches (changes into state 21). When a cache line is in state 24, replacing it from an L1 D cache only causes the corresponding inclusion bit to be turned off. Replacing it from L1 I caches or loading it into other I caches does not affect the inclusion bit. Loading the cache line in more D caches will cause the corresponding inclusion bits to be turned on. The only operations that change the cache line state from 24 is to replace the cache line from L2 cache and all L1 caches.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A multi-processor data processing system comprising:
   a plurality of N processors each having a high level cache split into a data cache and an instruction cache;
   a shared next lower level cache connected to high level caches of each of said processors by first interconnection means;
   a main memory connected to said lower level cache by second interconnection means;
   said next lower level cache including a L2 directory having N inclusion bits per cache entry corresponding to the N processors and having a D bit and an I bit per cache entry;
   wherein having at least one of the N inclusion bits set and at least one of the D and I bit set in an entry of the lower level cache indicates that at least a high level cache corresponding to the set inclusion bit has the entry;
   wherein having only the D bit set in a lower level cache entry signifies that the entry is in only high level data caches whose corresponding inclusion bits in the lower level cache entry are set and is not in any of the instruction caches of the high level caches;

wherein having only the I bit set in a lower level cache entry signifies that the entry is in only the high level instructions caches whose corresponding inclusion bits in the lower level cache entry is are set and is not in any of the data caches of the high level caches; and wherein having both D and I bits set in a lower level cache entry signifies that the entry is in the high level data caches whose corresponding inclusion bits in the lower level cache entry are set and in at least one of the instruction caches of the high level caches, so that the N, D and I bits of the L2 directory indicate precisely which high level data cache has the entry, regardless of whether the entry is stored in both high level data and instruction caches, and which of the high level instruction caches has the entry, if the entry is stored solely in one or more of the high level instruction caches.

2. A multi-processor data processing system comprising:

a plurality of N processors each having a high level cache split into a data cache and an instruction cache;

a shared next lower level cache connected to high level caches of each of said processors by first interconnection means;

a main memory connected to said lower level cache by second interconnection means;

said next lower level cache including a L2 directory having N inclusion bits per cache entry corresponding to the N processors and having a D bit and an I bit per cache entry;

wherein an entry of the lower level cache having an inclusion bit set indicates:
  a) if only one of the D and I bits for the entry is set, that the entry is solely in the high level cache corresponding to the set inclusion bit, and
  b) if both the D and I bits for the entry are set, that the entry is in the high level data cache corresponding to the set inclusion bit, and is in at least one of the high level instruction caches.

* * * * *